United States Patent [19]

Peloquin

[11] Patent Number: 4,815,337

[45] Date of Patent: Mar. 28, 1989

[54] LOCKING RING FOR INDEPENDENT REAR SUSPENSIONS

[76] Inventor: Gary T. Peloquin, 2517 Alvord La., Redondo Beach, Calif. 90278

[21] Appl. No.: 109,320

[22] Filed: Oct. 19, 1987

[51] Int. Cl.$^4$ ............................................. F16H 1/44
[52] U.S. Cl. .................................... 74/711; 74/710.5
[58] Field of Search ....................... 74/710, 710.5, 711, 74/713; 192/66, 107 R, 49, 50

[56] References Cited

U.S. PATENT DOCUMENTS

| | | | |
|---|---|---|---|
| 1,529,804 | 3/1925 | Nogrady | 74/711 |
| 2,609,709 | 9/1952 | Pixler et al. | 74/711 |
| 2,749,264 | 6/1956 | Emrick | 192/66 X |
| 3,224,299 | 12/1965 | Holdeman et al. | 74/711 |
| 3,365,983 | 1/1968 | Jeakle | 74/711 |
| 3,402,799 | 9/1968 | Tharpe | 74/711 |
| 3,444,960 | 5/1969 | Killius et al. | 74/710.5 X |
| 3,587,346 | 6/1971 | Takahashi et al. | 74/710.5 |
| 4,735,108 | 4/1988 | Teraoka et al. | 192/50 X |

*Primary Examiner*—Leslie A. Braun
*Assistant Examiner*—Dwight G. Diehl
*Attorney, Agent, or Firm*—Fulwider, Patton, Rieber, Lee & Utecht

[57] ABSTRACT

A differential assembly for a motorized vehicle and method of construction are disclosed, the assembly including a lock ring secured around each of a pair of differential shafts for providing a spring lock permitting each shaft and road wheel to turn with a differential housing when driven by a ring gear, the lock ring structure and method of construction evenly distribute the acceleration torque to both differential shafts simultaneously for improving traction, the lock ring being circular and tapered, and including a straight, split separation orthogonal to the circumference of the circular lock ring for providing the spring-like lock, and a plurality of radial grooves for channeling lubrication. The method of construction permits the differential shafts to be constantly locked to the differential housing or the differential cover, respectively, until a specified torque difference is exceeded, permitting one of the differential shafts to break the spring-like lock providing substantial independency between the wheels.

34 Claims, 5 Drawing Sheets

LOCKING RING FOR INDEPENDENT REAR SUSPENSIONS

BACKGROUND OF THE INVENTION

This invention relates to differential assemblies for use in automobiles, and more particularly to differential assemblies of the type having a lock ring installed on each differential shaft for equalizing the distribution of the torque applied to each portion of the drive axle driving each wheel during initial acceleration.

In the field of automotive engineering, the power generated by the engine is transmitted to the wheels along a drive shaft via the transmission and the differential assembly. Drive trains may be designed for a plurality of applications including a rear wheel driven vehicle having a rear mounted engine and transmission, a front wheel driven vehicle having a forward mounted engine and transmission or a front mounted transverse engine having a forward mounted transmission and differential assembly referred to as a transaxle.

In particular, certain designs include the engine mounted adjacent to the differential assembly with the transmission situated therebetween. Various designs are possible depending upon the articulated linkage. The transmission includes an output pinion shaft having a pinion gear mounted on the end thereof. The pinion gear interfaces with an outer ring gear mounted on the outer housing of the differential assembly. The purpose of the differential assembly is to transfer the power from the pinion gear to the wheels via the ring gear and a pair of differential shafts.

The ring gear is generally bolted to the differential housing and to a differential cover. Thus, when the ring gear is rotated by the pinion gear the entire differential assembly rotates in the same direction while a carrier bearing permits the differential assembly to spin freely within a transmission housing. A pair of differential shafts are mounted within the differential housing for transmitting the torque applied to the ring gear to the vehicle wheels. The first differential shaft has a gear attached to one end and a set of splines machined into the opposite end. The splined end passes through the differential housing and the far end of the ring gear. The second differential shaft also includes a gear and a splined end which extends through the differential cover bolted to the differential housing.

Each splined end further includes a thrust washer mounted thereover between each differential shaft and respectively the differential housing or the differential cover. In essence, the thrust washer functions as a bearing surface to maintain alignment of the differential shafts for preventing excessive wear in the differential housing and the differential cover.

Within the differential housing, the two differential gears are separated and aligned by a spacer sleeve having a vertical penetration therethrough. Passing through the vertical penetration is a spider shaft having one of a pair of spider gears mounted on each end thereof. The spacing is such that the differential gears and the spider gears mesh. Thus, rotation of either differential shaft will cause movement in the individual meshed gears. The spider gears provide a partial independency between the vehicle wheels by permitting the differential gears to operate independent of one another.

In general, the differential housing and the spider shaft rotate with the ring gear within the transmission housing. The rotation of the spider shaft drives the spider gears and the differential gears on the differential shafts which pass through the differential assembly for driving the wheel.

During initial acceleration, a characteristic of the transmission is to apply the engine torque to only a single drive wheel. The power is transmitted to either a right mounted or a left mounted ring gear by the pinion gear, depending upon the design of the drive train. Consequently, either the right wheel or the left wheel initially receives the torque from the engine because the ring gear is located on the thrust side of the transaxle. The inertial resistance of one wheel is higher than that of the opposite wheel and the positioning of the ring gear permits the wheel with the lower inertial resistance to be driven.

Several problems were created due to this torque distribution to the wheels. A first problem was that upon acceleration of the vehicle, only one wheel was capable of providing traction to the vehicle. Under normal conditions, traction from only a single drive wheel is sufficient; however, if the vehicle was entrapped, as in mud, a single drive wheel was often inadequate to provide forward motion. Under these conditions, the driven wheel during acceleration would spin while the non-driven wheel was permitted to freewheel. Further, the differential assembly on the side receiving the initial torque during acceleration would experience rapid wear requiring excessive maintenance and overhaul.

A method was developed to more evenly distribute the initial torque to each wheel during acceleration. The method included inserting a tapered ring between the differential housing and the differential shafts. Generally, the tapered ring was circular having a plurality of radial grooves machined into the outer circumference for the purpose of passing lubrication therethrough. At the outer circumference along the longitudinal axis of the ring, there was a pair of unrelieved rectangular corners. The tapered ring was designed to lock the differential shafts respectively to the differential housing and the differential cover. In actual operation, one of the tapered ring was fitted over each of the splined ends of the differential shafts. Each of the tapered rings were seated within an interior recess at the point where each differential shaft extends from the differential assembly.

Each of the tapered rings included a forty-five degree angled cut which, by design, provided a spring-like effect. The spring-like effect would cause the differential shafts to be locked respectively to the differential housing and differential cover so that if the drive wheel became entrapped, the tapered ring permitted the initial torque to be applied to both drive wheels during acceleration permitting the vehicle to escape.

With the advent of the tapered ring, additional problems were created. The forty-five degree angled cut on the tapered ring included a pair of faces which, if misaligned during installation, would interfere with one another causing the tapered ring to fail to lock the housing and cover to the differential shafts. Further, the tapered ring would operate properly only if the differential shaft was rotated in a specified direction.

Still another problem was that the tapered ring was subject to fracture during the slightest impact. Thus, if either one of the drive wheels bumped a curb, the tapered ring would fracture notwithstanding the fact that the other components in the differential assembly were not damaged. It has been observed that the tapered ring tends to fracture at the unrelieved rectangular corners. The fracture would result in a release of the spring-like lock between the differential shafts and respectively the differential housing and cover resulting in the torque again being applied to the single driven wheel during acceleration. Further, the fractured tapered ring would cause a loud grinding noise within the differential assembly which was a nuisance.

Hence, those concerned with the development and use of differential assemblies in motorized vehicles have long recognized the need for improved distribution of the initial accelerating torque to the drive wheels for eliminating the fracturing of the tapered ring which locks the differential shafts respectively to the differential housing and cover and for improving the design of the tapered ring at the situs of the fracture. Further, there is a need for an improved tapered ring for reducing the excessive wear of components on the thrust side of the differential assembly which may ultimately result in the fracture of the differential gear shaft from the torque initially applied to the driven wheel during acceleration. The present invention fulfills all of these needs.

SUMMARY OF THE INVENTION

Briefly, and in general terms, the present invention provides a differential assembly construction which substantially reduces the probability of fracture of a lock ring employed to lock a differential housing or a differential cover to the respective differential shafts, and which significantly reduces the excessive wear of components mounted on the thrust side of the differential assembly. Moreover, the differential construction of the present invention dampens the mechanical harmonics to which the lock ring is exposed, eliminates an inferior spring angled cut and a plurality of unrelieved rectangular corners from the lock ring and reduces the probability of differential gear shaft fracture, the differential assembly having an independency within the design and being accessible for repair with common tools.

Basically, the present invention is directed to an improved mechanical method and apparatus for more equally distributing the initial torque during acceleration from an automobile transmission pinion gear to each of a pair of shafts or axles within a differential assembly which drive the road wheels. This is accomplished by incorporating a lock ring which permits each of the pair of differential shafts to rotate with the gear driven differential assembly during initial acceleration until the torque transmitted by the first differential shaft differs from the torque transmitted by the second differential shaft by a predetermined difference.

In accordance with the improved apparatus, the lock ring incorporates a straight (non-angular) split separation within the lock ring which is orthogonal to the circumference thereto and a plurality of radial grooves formed into the circumference of the lock ring for passing lubricating fluid. The lock ring includes a first end which is tapered and a second end which is flush. The flush end interfaces with a thrust washer, a spring seat, and a spring for securing the lock ring in place.

In accordance with the improved method, a single lock ring is fitted over the end of each differential shaft with the tapered end mating with an interior recess of the differential housing or the differential cover. This structure forms a spring lock securing each shaft to the respective housing or cover by spring pressure such that the non-driven differential shaft does not free wheel but, in effect, is rotated along with the driven wheel during acceleration.

The new and improved differential assembly construction of the present invention substantially reduces the probability of fracture of the lock ring employed by providing a constant lock between the differential shaft and the differential housing or cover until a particular torque difference permits the differential shaft to break the lock with the differential housing or cover providing substantial independency in the differential assembly. Further, the invention significantly reduces the excessive wear of components on the thrust side of the differential assembly, dampens the mechanical harmonics in which the lock ring is exposed, eliminates the design flaws incorporated in similar tapered rings of the past, reducing the probability of differential gear shaft fracture, and is accessible for repair with common tools.

These and other features and advantages of the invention will become apparent from the following more detailed description, when taken in conjunction with the accompanying drawings, which illustrate, by way of example, the features of the invention.

DETAILED DESCRIPTION OF THE PREFERRED EMBODIMENT

As shown in the drawings for purposes of illustration, the invention is embodied in a vehicle differential assembly 100 of the type having a pair of differential shafts 102, 104 rotating with a differential housing 106 and a differential cover 108 within a transmission case 110, each of the differential shafts being locked to the differential housing or the differential cover, respectively, for more evenly distributing the initial torque to each differential shaft during acceleration.

In automotive engineering, drive trains may be designed for a plurality of applications, including a rear wheel driven vehicle having a rear mounted engine and transmission, a front wheel driven vehicle having a forward mounted engine and transmission, or a front mounted transverse engine having a forward mounted transmission and differential assembly referred to as a "transaxle."

Figure 1:
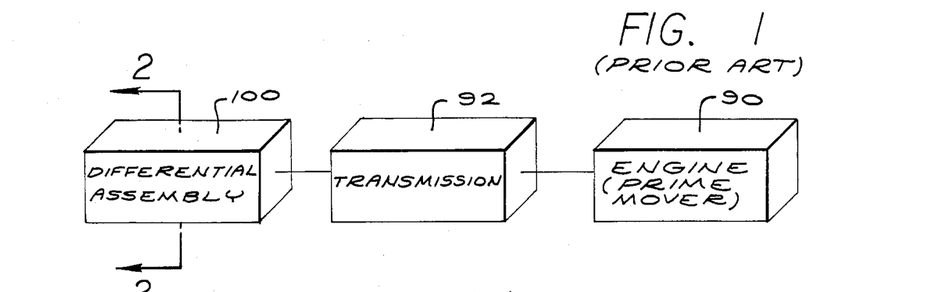
FIG. 1 is a block diagram of the major elements of a motor vehicle drive train of the prior art.
Figure 2:
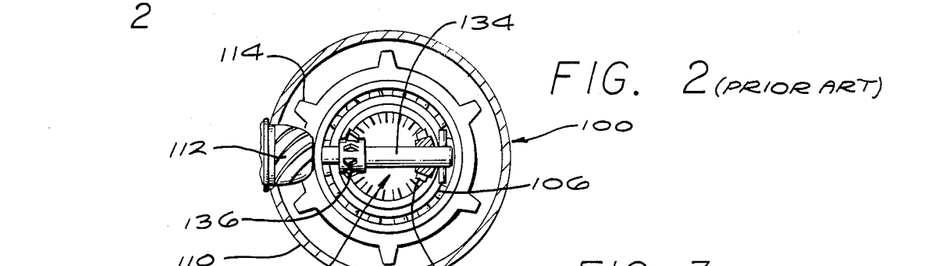
FIG. 2 is a cross-sectional view of a differential assembly taken along line 2—2 of FIG. 1.
Figure 3:
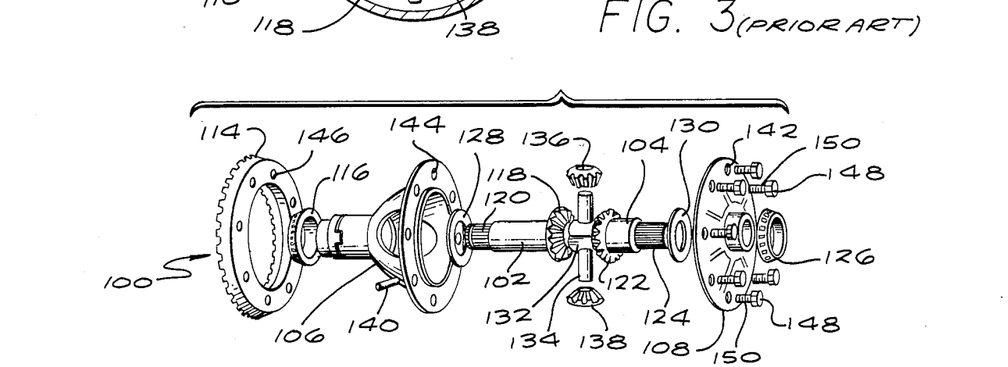
FIG. 3 is an exploded view of the differential assembly of FIG. 2.

In particular, certain designs include an engine 90 mounted adjacent to the differential assembly 100 with a transmission 92 situated therebetween. However, various designs are possible depending upon the articulated linkage between the engine, the transmission, and the differential assembly. The torque developed by the engine 90 is transferred to the transmission 92 via the main shaft (not shown). The general function of the transmission is to coordinate the driving gear with the speed of the engine in revolutions per minute. The transmission 92 includes an output pinion shaft (not shown) having a pinion gear 112 mounted on the end of the pinion shaft which interfaces with a ring gear 114 mounted on the exterior of the differential assembly as shown in FIGS. 2 and 3.

The general function of the differential assembly 100 is to transfer the power from the pinion gear 112 extending from the transmission 92 to the wheels of the vehicle (not shown) via the ring gear 114 and the pair of differential shafts 102, 104. The ring gear is bolted to the differential housing 106 and to the differential cover 108. Therefore, when the ring gear 114 is rotated by the pinion gear 112, the entire differential assembly 100 rotates in the same direction while a carrier bearing 116 permits the differential assembly 100 to spin freely within the transmission case 110. One of the carrier bearings is physically pressed onto each of the differential housing and the differential cover for permitting the free rotation of the differential assembly 100 as a complete unit within the transmission case.

The pair of differential shafts include the long differential shaft 102 and the short differential shaft 104, the long differential shaft being comparatively longer than the short differential shaft. The long shaft 102 and the short shaft 104 are housed within the differential housing 106 for transmitting the torque applied from the ring gear 114 to the wheels of the vehicle (not shown).

The long shaft 102 includes a differential gear 118 attached to one end and a set of splines 120 machined into the opposite end. Likewise, the short shaft 104 includes a differential gear 122 with a set of splines 124 machined into the opposite end. After assembly, the splined end 120 of the long shaft 102 extends from the end of the differential housing and through the ring gear 114. Also, the splined end 124 of the short shaft 104 extends through the differential cover 108 and through a second carrier bearing 126 duplicate in structure and function to the first carrier bearing 116. It is the length of the long shaft 102 between the splined end 120 and the differential gear 118 that is longer than the corresponding length of the short shaft 104 between the splined end 124 and the differential gear 122.

The splined end 120 further includes a first thrust washer 128 seated at the interface between the splined end 120 and the long shaft 102 while the splined end 124 likewise includes a second thrust washer 130 which is also seated at the interface between the splined end 124 and the short shaft 104. The general function of each of the thrust washers 128, 130 is to act as a bearing surface between the long shaft 102 and the differential housing and likewise between the short shaft 104 and the differential cover for assisting in maintaining alignment and for preventing excessive wear of the component parts.

Within the differential housing 106, the differential gear 118 is separated and aligned with the differential gear 122 by a spacer sleeve 132 having a vertical penetration therethrough. Passing through the vertical penetration in the spacer sleeve 132 is a spider shaft 134 having a first end and a second end. A first spider gear 136 is mounted on the first end of the spider shaft 134 while a second spider gear 138 is mounted on the second end of the spider shaft. The separation provided by the spacer sleeve 132 is such that the differential gears 118, 122 mesh with the spider gears 136, 138 maintaining alignment therebetween. Thus, rotation of either differential shaft will cause movement of the individual meshed gears. The spider gears 136, 138 provide a partial independency between the vehicle wheels by permitting the differential gears 118, 122 to operate independent of one another.

A split pin 140 penetrates the differential housing 106 and locks the spider shaft 134 in position so that when the ring gear 114 rotates and carries the differential housing therewith, the spider shaft 134 also rotates. The split pin 140 extends from the differential housing and locks the spider shaft in place so that it becomes, in essence, a fixed element of the rotating differential housing.

The differential cover 108 acts to close off the opening of the differential housing 106 for securing each of the previous mentioned elements within the differential assembly 100. The differential cover, similar to an access plate, includes a plurality of machine penetrations 142 which are aligned to a plurality of machine penetrations 144 in the differential housing 106 and likewise aligned to yet another plurality of machine penetrations 146 in the ring gear 114. Further, there is included a plurality of threaded bolts 148, each bolt accompanied by a spring washer 150 for passing through each of the penetrations in the differential cover, the differential housing, and the ring gear. The function of the bolts 148 is to secure the entire differential assembly 100 together.

In general, the differential housing 106 and the spider shaft 134 rotate with the ring gear 114 within the transmission case 110. The split pin 140 causes the spacer sleeve 132 to rotate driving the spider gears 136, 138 in rotation about the differential gears 118, 122 on the differential shafts 102, 104 which pass through the differential assembly 100 for driving the wheels. The transmission is designed to apply the initial engine torque to only a single drive wheel of the vehicle during acceleration. The torque is transmitted to either a right mounted or a left mounted ring gear 114 by the pinion gear 112, depending upon the design of the drive train. Consequently, either the right wheel or the left wheel initially receives the torque from the engine during acceleration. The inertial resistance of one wheel is usually higher than that of the opposite wheel so that the positioning of the ring gear permits the wheel with the lower inertial resistance to be driven.

Because of the above-described torque distribution to the vehicle wheels during acceleration, several initial problems were created. One of those problems was that upon acceleration of the vehicle, only one of the wheels was capable of providing traction to the vehicle. Normally, traction from only a single drive wheel would be sufficient; however, if the vehicle was entrapped, as in mud, sand, or snow, a single drive wheel was often inadequate to provide forward motion to the vehicle. The driven wheel would normally spin on the non-solid surface during acceleration of the vehicle, while the non-driven wheel was permitted to freewheel. A second problem existed in that the components of the differential assembly on the side receiving the initial torque during acceleration experienced rapid wear requiring additional maintenance and replacement.

Figure 4A:
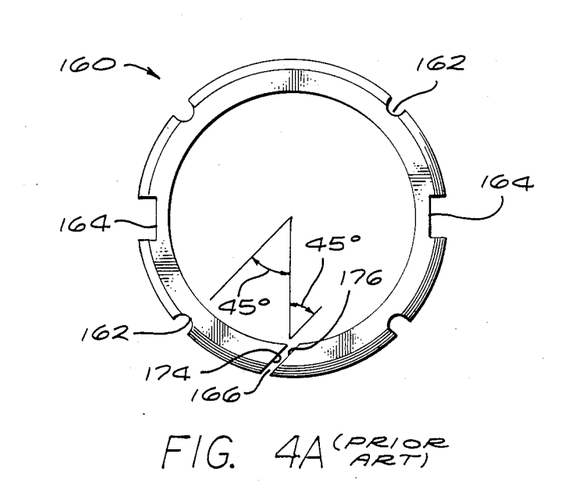
FIG. 4A is a front elevational view of a tapered ring of the differential assembly of FIG. 2.
Figure 4B:
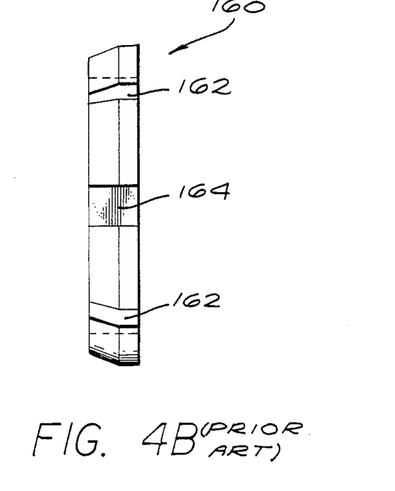
FIG. 4B is a side elevational view of the tapered ring of FIG. 4A.

A tapered ring 160 shown in FIG. 4A and 4B was developed to more evenly distribute the initial torque to each wheel during acceleration of the vehicle. This was accomplished by inserting the tapered ring 160 between the differential shafts 102, 104 and the differential housing 106 or the differential cover 108, respectively. The tapered ring was circular having a plurality of radial grooves 162 machined into the outer circumference at ninety degree intervals for the purpose of passing lubrication therethrough. At the outer circumference along the longitudinal axis of the tapered ring 160 was a pair of unrelieved rectangular corners 164. Further, the tapered ring 160 included an angled cut 166 in the outer circumference in a diagonal fashion at, typically, 45 degrees. The angled cut 166 in the ring 160 provided a spring-like effect which permitted the differential shafts 102, 104 to be locked respectively to the differential housing and differential cover.

Figures 5, 6:
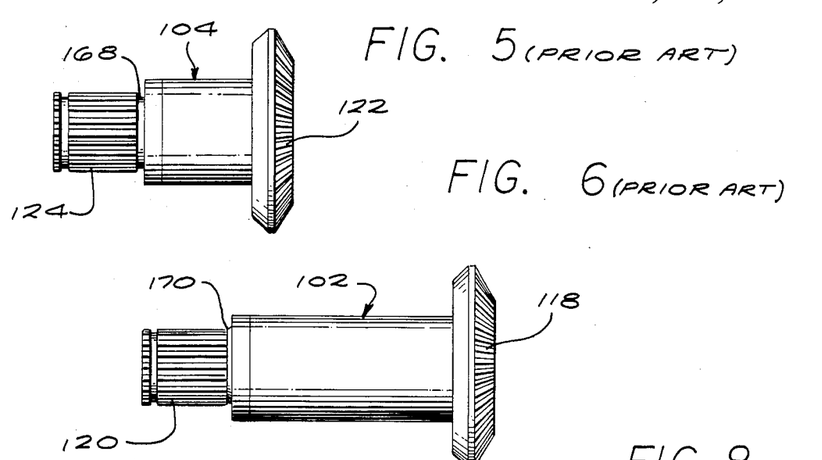
FIG. 5 is a side elevational view of a short differential shaft and gear of the differential assembly of FIG. 2.
FIG. 6 is a side elevational view of a long differential shaft and gear of the differential assembly of FIG. 2.
Figures 7, 8, 9:
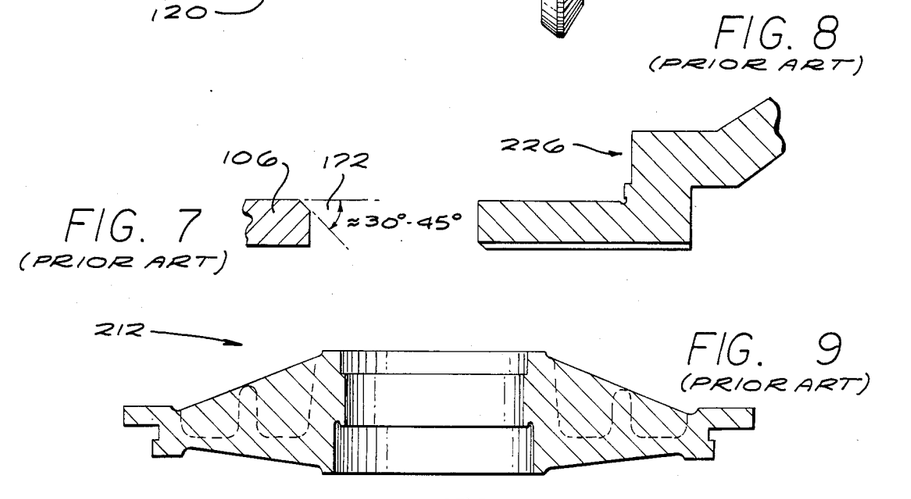
FIG. 7 is an enlarged fragmentary cross-sectional view of an interior recess of a differential housing or cover including the insertion angle of the differential assembly of FIG. 2.
FIG. 8 is a cross-sectional fragmentary view of a reduced diameter portion of the axle drive flange of the differential assembly of FIG. 2.
FIG. 9 is a cross-sectional view of a final drive cover of the differential assembly of FIG. 2.

In actual operation, the tapered ring 160 is fitted over each of the splined ends 120, 124 of the long shaft 102 and the short shaft 104. The tapered ring is seated at the interface position 168 of the splined end 124 and the short shaft 104, as shown in FIG. 5. Likewise, a tapered ring is also mounted at the interface position 170 between the splined end 120 and the long shaft 102, as shown in FIG. 6. Each of the tapered rings are seated within an interior recess not shown) located between each of the differential shafts 102, 104 and the differential housing 106 with the differential cover 108, respectively. A tapered angle 172 machined into the forward section of the interior recess of the differential housing 106 or the differential cover 108, as shown in FIG. 7, was an incline angle measuring approximately, for example, between thirty-to-forty five degrees.

The tapered ring 160 permitted a more even distribution of the initial acceleration torque to be applied to both wheels permitting the vehicle to escape an entrapped condition, for example, in mud. The forty-five degree angled cut 166 on the tapered ring 160 included a pair of faces 174, 176, which, if misaligned during installation, would interfere with one another, causing the tapered ring to fail to lock the differential housing and the differential cover to the respectively differential shafts. Further, because of the forty-five degree angled cut 166 of the tapered ring 160, proper rotation of the differential shafts 102, 104 was required. Thus, if the tapered ring 160 was installed so as to be inconsistent with the direction of rotation of the differential shaft, the ring would not lock correctly and the shaft would not be secured to the differential housing or the differential cover, respectively.

An equally serious problem was that the tapered ring 160 was subject to fracture at the slightest impact, for example, if either one of the wheels bumped a curb. The fracture would occur notwithstanding the fact that the other components in the differential assembly 100 were not damaged. The tapered ring tends to fracture along the unrelieved rectangular corners 164 resulting in a release of the spring-like lock between the differential shafts and the differential housing or differential cover, respectively. The fracture of the tapered ring 160 was accompanied by a loud grinding noise within the differential assembly 100 resulting in the acceleration torque again being applied to a single drive wheel during acceleration, and in excessive wear to those components on the thrust side of the differential assembly.

In accordance with the present invention, a lock ring 200 and a spring assembly comprised of a spring 202 and a spring seat 204 cooperate to distribute the torque developed by the engine 90 to both the long differential shaft 102 and the short differential shaft 104 simultaneously and to significantly reduce the excessive wear of structural components on the thrust side of the differential assembly 100. Further, the construction of the differential assembly incorporates an independency between the differential shafts, dampens the mechanical harmonics to which the lock ring is exposed, reduces the probability of differential shaft fracture and is accessible for repair utilizing common tools.

Figure 10:
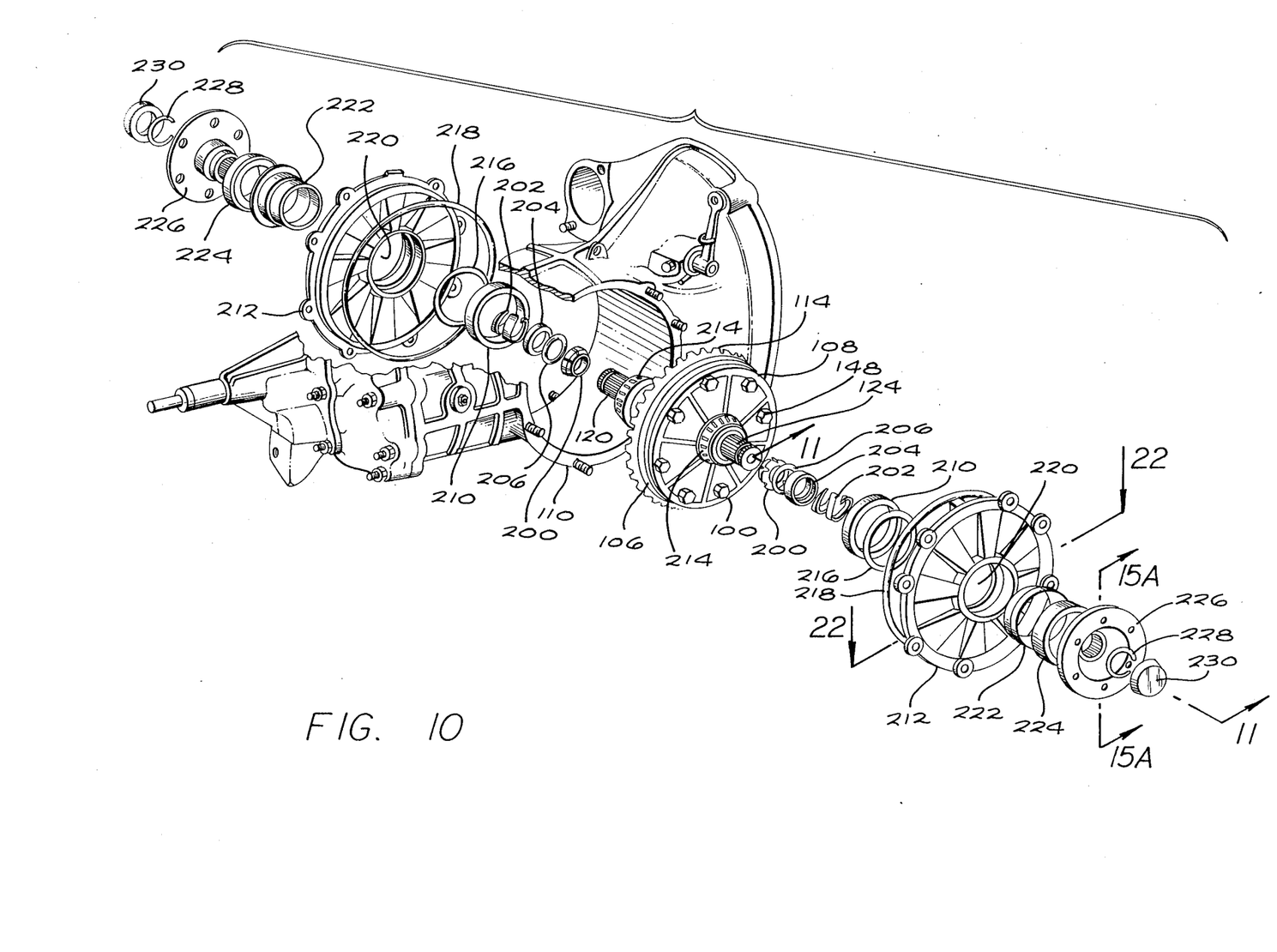
FIG. 10 is an exploded view of a differential assembly in accordance with the present invention.

Located between the lock ring 200 and the spring seat 204 is a thrust washer 206 which is useful in dampening the mechanical harmonic oscillations to which the lock ring is exposed. Note that the combination of elements including the lock ring 200, the thrust washer 206, the spring seat 204, and the spring 202 are each fitted over the splined end 120 of the long shaft 102 and the splined end 124 of the short shaft 104 as is illustrated in FIG. 10. The differential assembly 100 of the preferred embodiment is similar to the differential assembly described with reference to FIG. 3 with modifications as disclosed hereinafter. The differential assembly is mounted within the transmission case 110 with the long shaft 102 having a carrier bearing mounted thereon.

The carrier bearing is comprised of a roller cage 210 acting as an inner bearing race mounted within an exterior opening of each of a pair of final drive covers 212. The carrier bearing further includes a roller bearing 214 acting as an outer bearing race and mounted on the long differential shaft 102 outside of the lock ring 200 and the spring 202. Mounted on each differential shaft on the outside of the roller bearing 214 is a shim 216 utilized as a spacer device within the final drive covers 212. Located inside each of the final drive covers 212 is an O-ring 218 which acts as a sealing device to prevent the leakage of lubrication fluid contained within the transmission case 110.

The pair of final drive covers 212 act to enclose the differential assembly 100 within the transmission case 110, each of the final drive covers being bolted to the transmission case during assembly. Each of the final drive covers includes a center penetration 220 for receiving a seal holder 222 incorporating a sealing device 224. A front portion of the seal holder 222 is mounted in the center penetration 220 of each final drive cover 212 while the sealing device 224 is mounted in a rearward receptacle of the seal holder 222. The sealing device is also mounted flush against an axle drive flange 226. Each of the differential shafts extends through the respective drive flanges 226 with the end of each of the differential shafts being designed to receive a snap ring 228 and a rubber cap 230.

The invention as disclosed has been adapted for rear engine vehicles; however, the novel improvements incorporated therein are also applicable to forward-mounted engines and front wheel drive constructions. Note that the acceleration torque applied to the rear mounted differential assembly 100 drives only a single wheel and results in excessive wear to components. However, the wheel that is driven and the components that are worn are on the opposite side of the assembly due to the position of the ring gear 114.

The lock ring 200 has been designed to eliminate the unrelieved rectangular corners and the forty-five degree angled cut that existed in the tapered ring of the past. The unrelieved rectangular corners have been replaced with an additional pair of radial grooves 162; however, that pair of radial grooves replacing the unrelieved rectangular corners could be eliminated to increase the strength of the lock ring. The remaining radial grooves 162 spaced at ninety degree intervals about the lock ring would be adequate to channel sufficient lubrication through the transmission case 110 to keep the differential assembly 100 lubricated and cooled.

Figure 11:
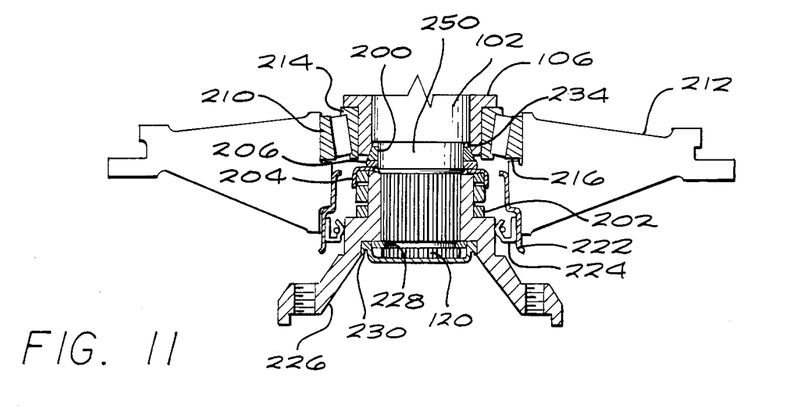
FIG. 11 is a cross-sectional view of the differential assembly taken along the line 11—11 of FIG. 10.
Figures 12A, 12B, 13A, 13B, 14A, 14B, 15A, 15B:
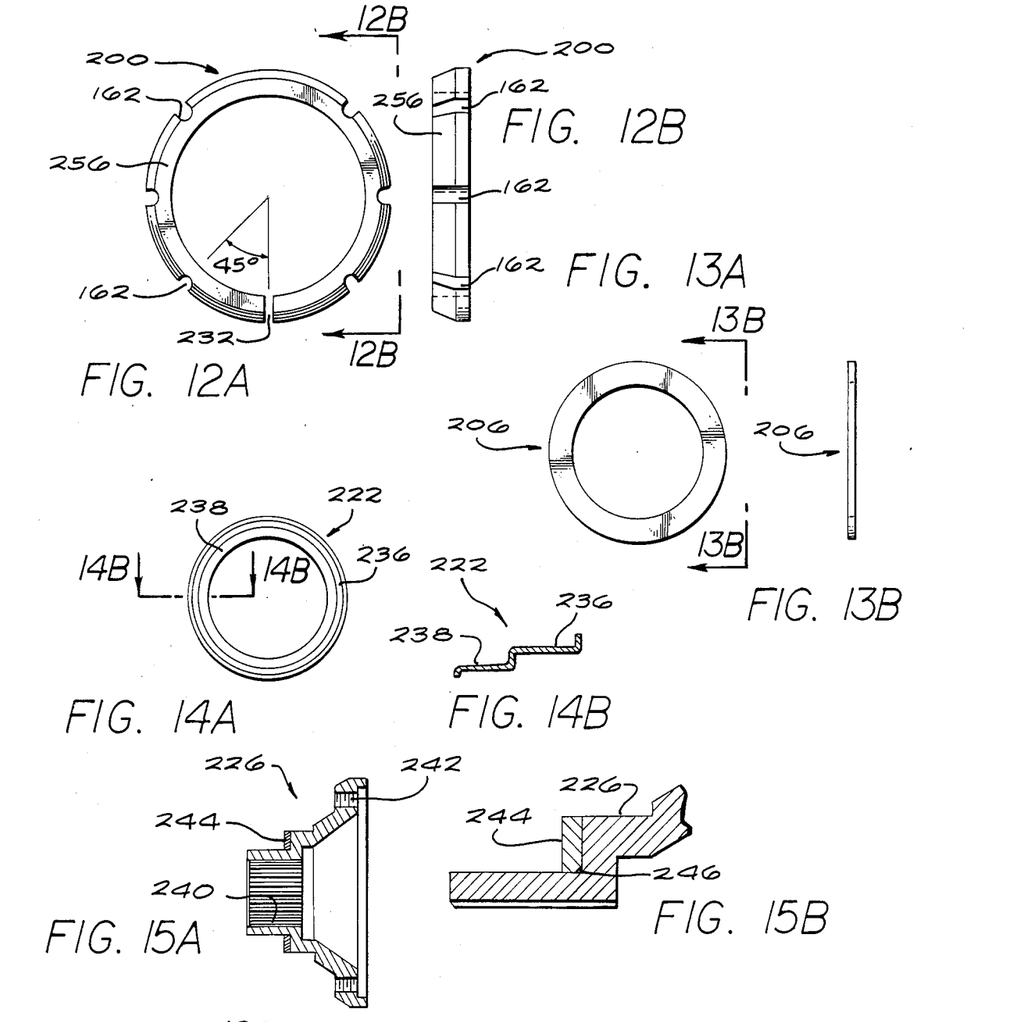
FIG. 12A is a front elevational view of a lock ring of the differential assembly of FIG. 10.
FIG. 12B is a cross-sectional view of the lock ring of the differential assembly taken along the line 12B—12B of FIG. 12A.
FIG. 13A is a front elevational view of a thrust washer of the differential assembly of FIG. 10.
FIG. 13B is a cross-sectional view of the thrust washer of the differential assembly taken along the line 13B—13B of FIG. 13A.
FIG. 14A is a front elevational view of a seal holder of the differential assembly of FIG. 10.
FIG. 14B is a cross-sectional view of the seal holder of the differential assembly taken along line 14B—14B of FIG. 14A.
FIG. 15A is a cross-sectional view of an axle drive flange of the differential assembly taken along the line 15A—15A of FIG. 10.
FIG. 15B is an enlarged fragmented view of the axle drive flange of FIG. 15A.

A straight split separation 232 employed in the lock ring 200 provides the spring-like effect necessary for the lock ring to secure each of the differential shafts 102, 104 to the differential housing 106 or the differential cover 108, respectively, as shown in FIGS. 11 and 12A. The elimination of the forty-five degree angled cut also eliminates the angled cut faces 174, 176 which tended to interfere with each other if the tapered ring 160 illustrated in FIG. 4 was not aligned properly. By eliminating the unrelieved rectangular corners of the tapered rings of the past and by providing the straight split separation 232, the probability of lock ring fracture during normal operation is reduced (as is illustrated in FIG. 2B).

The distribution of the components in the assembled state locates the lock ring 200 in a position between the differential shafts 102, 104 and the differential housing 106 or differential cover 108, respectively, as is clearly illustrated in FIG. 11. The lock ring 200 is tapered, fashioned out of copper and employed for maintaining a constant load on each of the differentials shafts 102, 104 in the independent rear suspension type of transaxle; however, the lock ring may also be employed to improve the performance of the front wheel drive type of transaxle. The constant load applied to each of the differential shafts 102, 104 enables both of the shafts to be driven at all times and still be independent from one another under conditions described hereinafter. The constant applied load also requires that both the differential shafts and the spider gears 136, 138 absorb the initial shock of the acceleration torque rather than just the differential shaft mounted on the thrust side of the ring gear.

This design improves the durability and longevity of the differential shafts, the spider gears, and the entire differential assembly 100. This structure is significant because the lock ring 200 permits the torque of the engine applied through the pinion gear 112 of the transmission to be distributed to both of the differential shafts simultaneously. Thus, the lock ring permits the energy developed by the engine to be distributed to each wheel simultaneously to assist in eliminating the excessive and uneven wear on those components located on the thrust side of the transaxle. The lock ring 200 secures the respective differential shaft to the differential housing 106 or the differential cover 108 because the lock ring locks the source that drives the wheel which is, in combination, the long shaft and the short shaft. Since the lock ring secures the differential shafts to the differential housing or the differential cover, respectively, the entire differential assembly 100 is permitted to rotate as a complete unit. In the absence of the lock ring, the differential shafts, unless secured, are permitted to freewheel.

The differential shafts 102, 104, although being locked together by the lock ring 200 during the acceleration of the vehicle, maintain independency from one another. This independency permits each of the wheels to operate together during acceleration because the long shaft 102 is secured to the differential housing 106 and the short shaft 104 is secured to the differential cover 108. However, the locking of the two differential shafts occurs only as long as one differential shaft experiences less than forty percent, more torque than the opposite differential shaft such as during acceleration. If one of the differential shafts experiences an applied torque which exceeds the torque applied to the opposite differential shaft by at least forty percent, then the differential shaft with the increased torque applied thereto will break free from the respective differential housing or differential cover. This action then permits independent operation of the wheels.

An example of the independency provided by the lock ring 200 occurs when the acceleration torque is applied to each of the differential shafts simultaneously and one of the differential shafts spins without providing traction. This could be the result of the respective wheel being entrapped in, for example, mud, sand or snow. When the torque on the drive flange 226 of the wheel providing traction reaches thirty-to-forty pounds, the lock between the wheel providing traction and the differential assembly will be broken. Thus, the differential shaft is referred to as being "locked" at a forty percent rate.

The lock is created by designing the inside diameter of the lock ring 200 to be approximately the same size as the outside diameter of the corresponding differential shaft. During installation, the straight split separation 232 designed into the lock ring permits the lock ring to be inserted over the respective differential shaft and slid into an interior recess 234 of the differential housing 106 and the differential cover 108. Under these conditions, the ring is secured to the differential shaft and the taper on the lock ring mates with an access angle provided at the mouth of the interior recess 234 as described hereinafter. The lock ring locks onto the differential housing or the differential shaft depending on which component offers the least resistance. If the ring locks onto the differential shaft, the clearance is designed such that the ring can spin within the differential housing if the forty percent applied torque rate is exceeded. However, if the ring locks within the opening of the differential housing or the differential cover, the shaft can spin within the ring if the forty percent applied torque rate is exceeded. The ring further expands and locks itself within the housing after continued use.

The power developed by the engine 90 is normally transferred to each of the differential shafts 102, 104 by way of the pinion gear 112 which drives the ring gear 114 and the differential assembly 100. The spider shaft 134, being an integral part of the differential housing, rotates with the differential assembly turning the respective differential shafts and wheels. If the vehicle becomes entrapped, for example, as in mud, sand, or snow, the independency provided by the spider gears 136, 138 and the differential shafts 102, 104 is temporarily suspended. This is accomplished by reducing the engine speed to an idle for reengaging each lock ring 200 so that the drive torque will be evenly distributed to each differential shaft 102, 104. This action will increase the probability that the vehicle will escape under its own power. If the differential assembly 100 is assembled without utilizing the lock ring 200 and if the driven wheel is entrapped, the opposite wheel can freewheel.

However, if the differential assembly is designed so that the differential shafts are permanently locked to one another without any independency, then both wheels will spin together increasing the probability that the vehicle can extract itself from the entrapping situation. Note that the lack of independency in the differential assembly 100 results in unsatisfactory operation when turning around corners. The lack of independency in the differential assembly causes the vehicle to skip or hop around the corner. Neither of these situations is satisfactory.

When the lock ring 200 is installed within the differential assembly, both wheels are locked together by employing a separate lock ring connected to each of the differential shafts and the respective differential housing or differential cover. The pair of lock rings 200 permits each of the wheels to be driven simultaneously but provides independency of one another for providing normal driving characteristics around corners to avoid a hopping or skipping situation. Thus, conventional features are provided when both wheels are partially locked together by employing the lock ring which permits rotation of each wheel during acceleration but still permits the vehicle to turn around corners in a smooth manner.

Further, the lock ring 200 improves the durability of the entire differential assembly 100 because the torque of the engine is applied to both of the wheels through both sides of the differential assembly. During acceleration, both of the differential shafts rotate driving each of the wheels, permitting the vehicle to develop sufficient traction and momentum to escape an entrapping situation. After one differential shafts exceed the forty percent applied torque difference of thirty-to-forty foot pounds compared to the other differential shaft, the locked condition of the loaded differential shaft releases so that the normal turning and operational characteristics of the vehicle return.

Another example of the operation of the independency of the differential assembly 100 lends itself to the understanding of the operation of the apparatus. If the first wheel of a vehicle employing the lock ring 200 thus having two drive wheels is entrapped, the entrapped first wheel will be idle while the opposite second wheel will turn. Under these conditions, the two spider gears 136, 138 will still be driven by the rotating combination of the ring gear 114 and the differential housing 106. The spider gears will drive the free differential gear 118 even though the opposite differential gear 122 is not turning because the opposite differential shaft is entrapped. The spider gears will rotate about the frozen differential gear 122 even though the frozen differential gear is meshed with the spider gears. The froze or lodged differential gear 122 is separated from the free differential gear 118 by the spacer sleeve 132 so that the free differential gear 118 and the corresponding differential shaft 102 can continue to operate and drive the free wheel.

If the occasion should arise that the lock ring 200 would have to be replaced, the operation is relatively simple. Before the differential assembly 100 may be accessed, a constant velocity joint (not shown) must be removed. Accessing the differential assembly in a rear engine driven vehicle is less complicated than accessing the differential assembly of a forward mounted transaxle of a front wheel drive vehicle. However, accessing the forward engine, front wheel drive vehicle for replacing the lock ring is possible by one skilled in the art.

The snap ring 228 is mounted around the splined ends 120, 124 of the differential shafts 102, 104 and on the external side of the drive flange 226. The combination of the snap ring and the drive flange retain the seal holder 222 and the sealing device 224 within the center penetration 220 of the final drive cover 212. Each of the components mounted on each of the differential shafts as discussed with reference to FIG. 10 are also held in position by the snap ring 228 which is secured with a clamping pressure of approximately three hundred foot pounds. In order to gain access to the differential assembly 100, the snap ring 228 must be removed. Normally, a common torque tool, for example, such as a sea bridge tool is employed to release the pressure. The pressure on the snap ring is gradually released so that the drive flange 226 may be removed.

Once the drive flange has been removed, access to the spring 202, the spring seat 204, the thrust washer 206, and the lock ring 200 is available through the seal holder 222. At this point, the lock ring 200 can be removed by tools common to most mechanics, such as a snap ring remover, a pair of needle nose plyers, or a pair of screwdrivers. Once the lock ring has been removed, it may be inspected and replaced in the manner opposite to that just described. The spring 202 must be replaced in the proper position since the lock ring 200 is held in position by the spring pressure and not the rotation of the spinning wheel. One of the snap rings is then replaced on the end of each of the splined ends 120, 124 of the differential shafts for holding each of the previously mentioned components, including the spring 202, in place.

The thrust washer 206 is connected directly behind the lock ring 200 and forward of the spring seat 204 for cushioning the lock ring from the mechanical harmonics which are created by the spring 202. The thrust washer, in essence, permits damage to the lock ring from mechanical vibration to be avoided. The thrust washer is a thin circular ring, as is illustrated in FIGS. 13A and 13B which fits over each of the splined ends 120, 124 but does not enter the interior recess 234 of the differential housing with the lock ring.

The seal holder 222, which is mounted in the center penetration 220 of each of the final drive covers 212, provides access to the differential assembly 100. The seal holder may be comprised of any suitable material, for example, such as metal, and holds the sealing device 224 within the center penetration of each of the final drive covers. The seal holder is shaped in such a manner as to have two diameters, as is illustrated in FIGS. 14A and 14B. An outer diameter 236 provides access to the spring 202 and the lock ring 200 for removal and installation utilizing common tools. An inner diameter 238 of the seal holder is mounted within the center penetration 220 of each of the final drive covers 212 for securing the seal holder 222. The sealing device 224 is generally a flexible form-fitting material, for example such as rubber which is seated within the seal holder 222 for preventing the leakage of the lubrication fluid contained within the transmission case 110 as shown in FIG. 10.

A first drive flange 226 is mounted around the splined end 120 extending through one of the final drive covers 212, while a second drive flange is mounted around the second splined end 124 extending through the second final drive cover. The function of the drive flange is to retain each of the components within the differential assembly 100. Each of the drive flanges is held in position by the clamping force of the snap ring 228 illustrated in FIG. 10. The drive flange includes a central opening 240 for accommodating one of the pair of differential shafts 102, 104 as is illustrated in FIG. 15A. Further, each drive flange includes a plurality of threaded openings 242 for receiving a plurality of bolts.

An additional feature of the invention is an extension ring 244 mounted around the reduced diameter end of the drive flange which extends the face of the drive flange for accommodating the sealing device 224. The extension ring 244 is pressed onto the reduced diameter end of the drive flange 226 and is seated against the face thereof as is shown in FIGS. 15A and 15B. The addition of the extension ring 244 permits the utilization of the novel dual-diameter seal holder 222 and the accompanying sealing device 224. A visual comparison of the drive flange 226 of the present invention with the counterpart employed in the prior art can be made by referring to FIG. 8. Note that the extension ring 244 appearing in the invention as illustrated in FIGS. 15A and 15B is not present in the drive flange illustrate in FIG. 8. A much smaller ring is mounted about the reduced diameter portion of the drive flange of FIG. 8 which would not accommodate the seal holder 222 of the present invention.

Figure 16A:
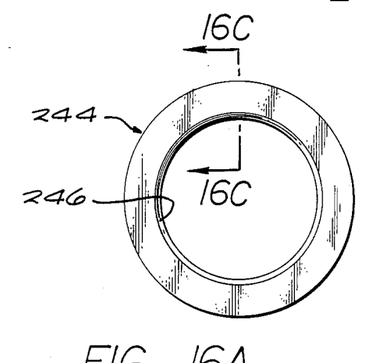
FIG. 16A is a front elevational view of an extension ring for mounting on the face of the axle drive flange of FIG. 15A.
Figure 16B:
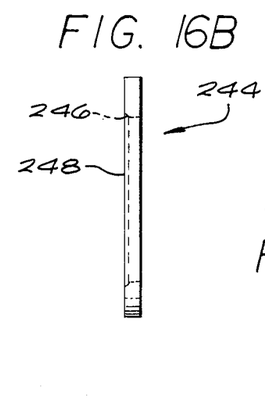
FIG. 16B is a side elevational view of the extension ring of the differential assembly of FIG. 16A.
Figure 16C:
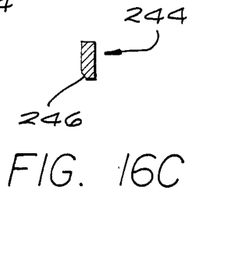
FIG. 16C is a cross-sectional view of the extension ring of the differential assembly taken along the line 16C—16C FIG. 16A.

The extension ring 244 is circular in nature and includes a tapered end 246, as is illustrated in FIGS. 16A, 16B and 16C. A side view of the extension ring illustrates the full depth of the ring at the terminal ends thereof so that the face of the drive flange 226 is extended for the sealing device 224 as is shown in FIG. 16B. The cross section clearly shows the tapered end 246 and a chamfer line 248 of the extension ring which is employed for assisting in the mounting of the extension ring around the reduced diameter portion of the drive flange.

The long differential shaft 102 and the short differential shaft 104 have been modified to permit the lock ring 200 to be seated thereon. Each of the differential shafts is machined at the interface between the splined ends 120 and 124 and the corresponding shafts 102, 104 for creating a ledge for seating the lock ring. A first machined ledge 250 provides a seat for the lock ring on the long differential shaft, as is illustrated in FIG. 17, while a second machined ledge 252 provides a seat for the lock ring on the short differential shaft, as is illustrated in FIG. 18.

Figure 17:
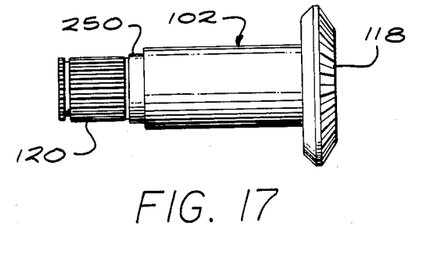
FIG. 17 is a side elevational view of a long differential shaft and gear of the differential assembly of FIG. 10.
Figure 18:
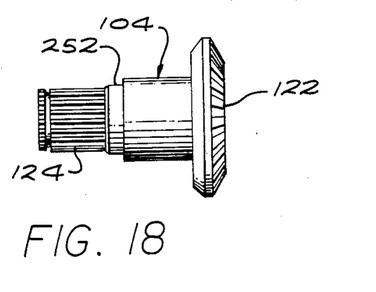
FIG. 18 is a side elevational view of a short differential shaft and gear of the differential assembly of FIG. 10.

The modified long differential shaft 102 of FIG. 17 may be compared with the long shaft, as illustrated in FIG. 6, while the modified short differential shaft 104 of FIG. 18 may be compared with the short shaft illustrated in FIG. 5. It becomes immediately obvious that the first machined ledge 250 and the second machined ledge 252 of the modified long and short shafts respectively provide a positive seat for accommodating the novel lock ring 200. Without creating a seat for the lock ring by machining the respective differential shafts, the lock ring could interfere with the roller bearing 214 and cause a malfunction therein resulting in a reduction of energy transferred to the wheels. By employing the lock ring 200, the ring gear 114 causes the individual differential shafts and differential gears to rotate which would otherwise freewheel when the vehicle is in an entrapped condition.

When one of the lock rings 200 is fitted over each of the differential shafts 102, 104, the lock ring is seated within the interior recess 234 located between the long differential shaft 102 and the differential housing 106 or between the short differential shaft 104 and the differential cover 108. It is from this position that the lock ring is capable of securing each of the differential shafts to the respective housing member so that when the differential assembly 100 is rotated with the ring gear, each of the respective shafts rotates in synchronism.

Figure 19:
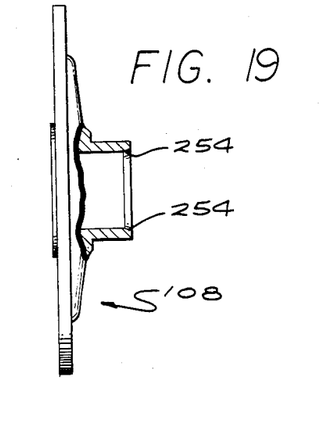
FIG. 19 is a side elevational view partly in fragmented cross-section of a housing cover of the differential assembly of FIG. 10.
Figure 20:
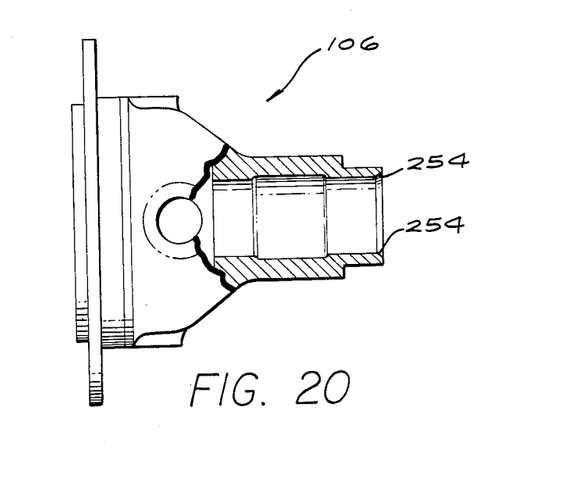
FIG. 20 is a side elevational view partly in fragmented cross-section of a differential housing of the differential assembly of FIG. 10.
Figures 21, 22:
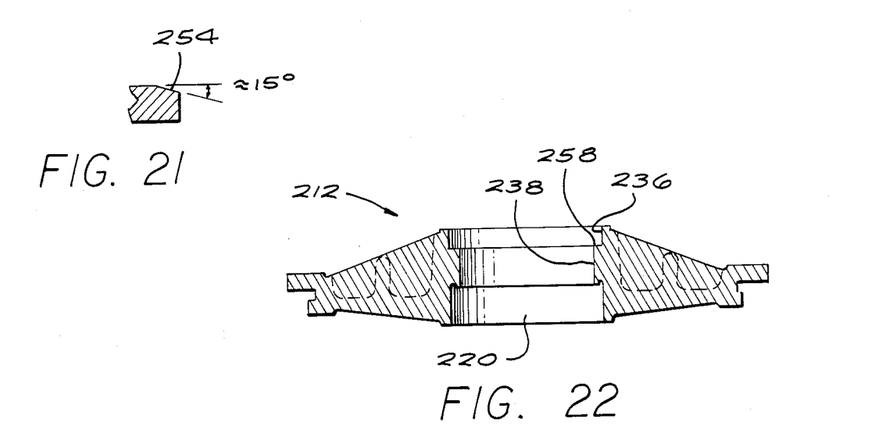
FIG. 21 is an enlarged fragmentary cross-sectional view of the tapered surface of an interior recess of the housing cover of FIG. 19 and of the differential housing of FIG. 20.
FIG. 22 is a cross-sectional view of the final drive cover of the differential assembly taken along the line 22—22 of FIG. 10.

The interior recess of both the differential housing and the differential cover include a tapered opening 254, as is illustrated in FIGS. 19 and 20. The tapered opening 254 is at an angle of approximately fifteen degrees with the horizontal, as is illustrated in FIG. 21. In the prior art, the corresponding angle of the tapered ring was within the range of thirty to forty-five degrees. This range of angles was very steep and has been modified to a fifteen degree angle to permit the novel lock ring 200 to be received into the interior recess 234 with greater ease. The fifteen degree angle located at the mouth of the interior recess 234 is the opening in which the lock ring seats, it being clear that the spring 202, the spring seat 204, and the thrust washer 206 remain seated on the respective differential shafts.

The fifteen degree tapered opening 254 permits the lock ring to enter the mouth of the housing or the cover and be compressed onto the differential shaft creating a semi-locking effect. The mating of the tapered surface of the lock ring, as is illustrated by the surface 256 in FIGS. 12A and 12B, with the fifteen degree tapered opening 254 of the interior recess 234 is important for providing a secure locking effect onto each of the differential shafts. The angled cut of the tapered opening 254 within the differential housing 106 and the differential cover 108 must accommodate the tapered surface 256 of the lock ring to permit the lock ring to seat properly. The fifteen degree tapered opening accomplishes this purpose.

Each of the seal holders 222 is mounted in one of the final drive covers 212, as is clearly illustrated in the exploded view of FIG. 10. Since the seal holder 222 includes the outer diameter 236 and the inner diameter 238, each of the final drive covers must be modified to permit the seal holder to seat within the center penetration 220 of the final drive cover. Therefore, the final drive cover 212 has been machined to provide a deeper bore 258 to accommodate the two-diameter seal holder, as illustrated in FIGS. 14A and 14B. The center penetration 220 of the final drive cover is shown and is equivalent in diameter to the inner diameter 238 of the seal holder while the diameter of the bore 258 is equivalent to the outer diameter 236 of the seal holder. By comparing the final drive cover 212 illustrated in FIG. 22 with the final drive cover of the prior art illustrated in FIG. 9, bore 258 exhibits a larger diameter and a greater depth for accommodating the two-diameter seal holder 222 of the present invention.

The differential assembly 100 of the present invention provides superior road traction to the vehicle wheels because each of the differential shafts 102, 104 is secured either to the differential housing 106 or the differential cover 108 via the lock ring 200. Further, the durability and efficiency of the differential assembly as a whole is improved simply because the power upon acceleration is transmitted to the differential gears 118, 122 through the differential assembly via the lock ring. Note that the first and second spider gears 136, 138 are utilized only after the forty percent applied torque rate between the differential shafts is exceeded.

The differential assembly 100 is novel over other prior art differential assemblies including, for example, the limited slip version. One of the several novel features of the instant invention is that the differential shafts are constantly locked together until the forty percent applied torque difference between the individual differential shafts is exceeded. This design is to be distinguished over the design of the limited slip version which operates on an inertial principle in which one wheel must rotate at a velocity which is forty percent greater than the velocity of the opposite wheel in order to activate the opposite wheel. This feature increases the probability that the vehicle may be removed from an entrapped situation under its own power.

From the foregoing, it will be appreciated that the differential assembly 100 of the invention applies the initial acceleration torque to both the differential shafts 102, 104 simultaneously for providing improved traction to the vehicle, while significantly reducing the probability of fracturing the lock ring 200 and further reducing the excessive wear of differential components mounted on the thrust side of the ring gear 114. Further, the differential assembly dampens the mechanical harmonics to which the lock ring is exposed, improves the design of the lock ring which minimizes the probability of differential gear fracture, and provides an assembled structure which may be repaired utilizing common tools. The differential shafts are locked together until the torque difference applied to the shafts exceeds forty percent, at which time normal handling characteristics are available.

While a particular form of the invention has been illustrated and described, it will be apparent that various modifications can be made without departing from the spirit and scope of the invention. Accordingly, it is not intended that the invention be limited, except as by the appended claims.

I claim:

1. A differential assembly for a motorized vehicle comprising, in combination:
   means for housing said differential assembly, said housing means being rotatively driven by a torque distribution means;
   first transmission means mounted within said housing means for transmitting torque from said housing means to a first pair of wheels;
   second transmission means mounted within said housing means for transmitting torque from said housing means to a second of said pair of wheels, said second transmission means being spaced from said first transmission means; and
   means for locking said first and second transmission means in synchronism with said housing means for rotatively driving said first and second transmission means during acceleration, said locking means including a separation orthogonal to the circumference of said locking means and being mounted between each of said transmission means and said housing means, wherein said first transmission means is independent from said second transmission means when the torque transmitted by said first transmission means differs from the torque transmitted by said second transmission means by a predetermined torque difference within a fixed range and wherein the fixed range of said torque difference is from thirty foot-pounds to forty foot-pounds.

2. The differential assembly of claim 1 wherein said housing means comprises a differential housing and a differential cover in mechanical communication with said differential housing.

3. The differential assembly of claim 2 wherein said differential housing includes a first penetration and a second penetration, said first penetration for communicating with said second transmission means and said differential cover and said second penetration for communicating with said first transmission means, said second penetration having an inner tapered surface for mating with a tapered side of said locking means.

4. The differential assembly of claim 3 wherein said inner tapered surface of said second penetration of the differential housing provides access to an interior recess, said locking means being secured within said interior recess.

5. The differential assembly of claim 1 wherein said first transmission means comprises a long differential shaft, said first transmission means being greater in length than said second transmission means.

6. The differential assembly of claim 1 wherein said second transmission means comprises a short differential shaft, said second transmission means being shorter in length than said first transmission means.

7. The differential assembly of claim 1 further including a spacer sleeve for spacing said second transmission means from said first transmission means.

8. The differential assembly of claim 1 wherein said locking means comprises a lock ring.

9. The differential assembly of claim 1 wherein said separation orthogonal to the circumference of said locking means provides a spring-like lock between said housing means and each of said transmission means.

10. The differential assembly of claim 1 wherein one of said locking means is secured around each of said transmission means and seated within an interior recess located between said housing means and each of said transmission means.

11. The differential assembly of claim 1 wherein said locking means further includes a plurality of radial grooves for providing lubrication channels, said radial grooves formed on said circumference of said locking means.

12. The differential assembly of claim 11 wherein each of said plurality of radial grooves is spaced from each adjacent radial groove on said circumference at an angle of no greater than ninety degrees.

13. The differential assembly of claim 1 wherein said locking means comprises a flush side and a tapered side, said flush side being seated juxtaposed to a thrust washer and said tapered side being seated in an interior recess between said housing means and each of said transmission means.

14. The differential assembly of claim 1 wherein said first transmission means includes a first end and a second end, said first end comprised of a first differential gear and said second end comprised of a first splined end.

15. The differential assembly of claim 14 wherein said first transmission means further includes a ledge for supporting one of said locking means, said ledge being positioned around said first transmission means intermediate said first differential gear and said first splined end, said ledge having a diameter smaller than a diameter of said first transmission means.

16. The differential assembly of claim 1 wherein said second transmission means includes a first end and a second end, said first end comprised of a second differential gear and said second end comprised of a second splined end.

17. The differential assembly of claim 16 wherein said second transmission means further includes a ledge for supporting one of said locking means, said ledge being positioned around said second transmission means intermediate said second differential gear and said second splined end, said ledge having a diameter smaller than a diameter of said second transmission means.

18. The differential assembly of claim 1 further comprised of a differential cover including a penetration for communicating with said second transmission means, said penetration having an inner tapered surface for mating with a tapered side of said locking means.

19. The differential assembly of claim 18 wherein said inner tapered surface of said penetration of the differential cover provides access to an interior recess, said locking means being secured within said interior recess.

20. A differential assembly for a motorized vehicle comprising, in combination:

means for housing said differential assembly, said housing means being rotatively driven by a torque distribution means;

first transmission means mounted within said housing means for transmitting torque from said housing means to a first of a pair of wheels;

second transmission means mounted within said housing means for transmitting torque from said housing means to a second of said pair of wheels, said second transmission means being spaced from said first transmission means; and means for locking said first and second transmission means in synchronism with said housing means for rotatively driving said first and second transmission means during acceleration, said locking means including a separation orthogonal to the circumference of said locking means and being mounted between each of said transmission means and said housing means, wherein said housing means comprises a differential housing and a differential cover in mechanical communication with said differential housing, said differential housing including a first penetration and a second penetration, said first penetration for communicating with said second transmission means and said differential cover and said second penetration for communicating with said first transmission means, said second penetration having an inner tapered surface for mating with a tapered side of said locking means, said inner tapered surface being at a fifteen degree angle with respect to a horizontal surface of said second penetration.

21. A differential assembly for a motorized vehicle comprising, in combination:

means for housing said differential assembly, said housing means being rotatively driven by a torque distribution means;

first transmission means mounted within said housing means for transmitting torque from said housing means to a first of a pair of wheels;

second transmission means mounted within said housing means for transmitting torque from said housing means to a second of said pair of wheels, said second transmission means being spaced from said first transmission means; and means for locking said first and second transmission means in synchronism with said housing means for rotatively driving said first and second transmission means during acceleration, said locking means including a separation orthogonal to the circumference of said locking means and being mounted between each of said transmission means and said housing means, wherein said housing means comprises a differential housing and a differential cover in mechanical communication with said differential housing, said differential cover including a penetration for communicating with said second transmission means, said penetration having an inner tapered surface for mating with a tapered side of said locking means, said inner tapered surface being at a fifteen degree angle with respect to the horizontal surface of said penetration.

22. A differential assembly for a motorized vehicle comprising, in combination:

a differential housing for enclosing said differential assembly, said differential housing being rotatively driven by a ring gear;

a first differential shaft mounted within said differential housing for transmitting torque from said differential housing to a first pair of wheels;

a second differential shaft mounted within said differential housing for transmitting torque from said differential housing to a second of said pair of wheels, said second differential shaft being spaced from said first differential shaft; and a lock ring mounted within an interior recess between each of said differential shafts and said differential housing for locking said first and second differential shafts in synchronism with said differential housing for rotatively driving said first and second differential shafts during acceleration, said lock ring including a separation orthogonal to the circumference of said lock ring for providing a spring-like lock wherein said differential assembly further includes a pair of final drive covers for enclosing said differential assembly within a transmission case, each of said final drive covers including a center penetration having a narrow inner diameter and a wide outer diameter for receiving a seal holder.

23. The differential assembly of claim 22 wherein said first differential shaft is independent from said second differential shaft when the torque transmitted by said first differential shaft differs from the torque transmitted by said second differential shaft by a predetermined value.

24. The differential assembly of claim 22 further including a thrust washer mounted around each of said differential shafts and in mechanical communication with said lock ring for providing a bearing surface to said lock ring and for isolating said lock ring from harmonic oscillations created by an alignment spring mounted around each of said differential shafts.

25. The differential assembly of claim 22 further including an alignment spring mounted around each of said differential shafts for forcibly securing said lock ring in position.

26. The differential assembly of claim 22 further including a spring seat mounted around each of said differential shafts between an alignment spring and said lock ring for providing an aligned seating surface for said spring.

27. The differential assembly of claim 22 wherein said seal holder is comprised of an outer portion having a wide diameter and an inner portion having a narrow diameter, said inner portion and part of said outer portion being inserted into said center penetration of said final drive cover, said seal holder including a sealing device.

28. A differential assembly for a motorized vehicle comprising, in combination:

a differential housing for enclosing said differential assembly, said differential housing being rotatively driven by a ring gear;

a first differential shaft mounted within said differential housing for transmitting torque from said differential housing to a first of a pair of wheels;

a second shaft mounted within said differential housing for transmitting torque from said differential housing to a second of said pair of wheels, said second differential shaft being spaced from said first differential shaft; and a lock ring mounted within an interior recess between each of said differential shafts and said differential housing for locking said first and second differential shafts in synchronism with said differential housing for rotatively driving said first and second differential shafts during acceleration, said lock ring including a separation orthogonal to the circumference of said lock ring for providing a spring-like lock, and wherein said differential assembly further includes a pair of drive flanges for connecting to said differential shafts, said drive flanges each including an extension ring mounted around each of said drive flanges for extending a concentric face of a reduced diameter portion of each of said drive flanges, said extension ring for mounting against a sealing device.

29. A method for evenly distributing the engine torque to each of a pair of differential shafts of a vehicle differential assembly, said method comprising the steps of:

enclosing said differential assembly within a housing;

mounting a first of said pair of differential shafts within said housing for transmitting torque from an engine to a first of a pair of wheels;

mounting a second of said pair of differential shafts within said housing for transmitting torque from said engine to a second of said pair of wheels;

separating said first differential shaft from said second differential shaft for providing independency;

providing a pair of drive flanges for connecting to said differential shafts, said drive flanges each including an extension ring mounted around each of said drive flanges for extending a concentric face of a reduced diameter portion of each of said drive flanges, said extension ring for mounting against a sealing device;

inserting a copper lock ring between each of said differential shafts and said housing for locking said first and second differential shafts in synchronism with said housing during acceleration, said lock ring having a torodial shape and including a separation orthogonal to a circumference of said lock ring for mounting around a reduced diameter portion of each of said differential shafts for providing a spring-like lock; and rotating said housing for driving each of said differential shafts and said pair of wheels.

30. The method as described in claim 29, further including the step of:

releasing said lock between each of said first and second differential shafts and said housing when the torque transmitted by said first differential shaft differs from the torque transmitted by said second differential shaft by a predetermined value.

31. A differential assembly for a motorized vehicle comprising, in combination:

means for housing said differential assembly, said housing means being rotatively driven by a torque distribution means;

first transmission means mounted within said housing means for transmitting torque from said housing means to a first of a pair of wheels;

second transmission means mounted within said housing means for transmitting torque from said housing means to a second of said pair of wheels, said second transmission means being spaced from said first transmission means; and means for locking said first and second transmission means in synchronism with said housing means for rotatively driving said first and second transmission means during acceleration, said locking means including a separation orthogonal to the circumference of said locking means and being mounted between each of said transmission means and said housing means, said locking means being secured in position by an alignment spring mounted within a spring seat located intermediate said alignment spring and a thrust washer, said thrust washer mounted in juxtaposition to said locking means for isolating said locking means from harmonic oscillation created by said alignment spring, wherein each of said locking means, said alignment spring, said spring seat and said thrust washer being mounted around each of said first and second transmission means and being held in position by a drive flange mounted around each of said transmission means, each flange including an extension ring for mounting against a sealing means.

32. A differential assembly for a motorized vehicle comprising, in combination:
a differential housing for enclosing said differential assembly, said differential housing being rotatively driven by a ring gear;
a first differential shaft mounted within said differential housing for transmitting torque from said differential housing to a first of a pair of wheels;
a second differential shaft mounted within said differential housing for transmitting torque from said differential housing to a second of said pair of wheels, said second differential shaft being spaced from said first differential shaft; and
a lock ring mounted within an interior recess between each of said differential shafts and said differential housing for locking said first and second differential shafts in synchronism with said differential housing for rotatively driving said first and second differential shafts during acceleration, said lock ring including a separation orthogonal to the circumference of said lock ring for providing a spring-like lock, wherein said differential housing being in mechanical communication with a differential cover, said differential cover including a penetration for communicating with said second differential shaft, said penetration having an inner tapered surface for mating with a tapered side of said lock ring, said inner tapered surface being at a 15° angle with respect to the horizontal surface of said penetration.

33. A lock ring for a vehicle differential assembly comprising, in combination:
a torodial shaped ring having a separation formed through said ring, said separation being orthogonal to a circumference of said ring for providing a spring-like lock; and
a plurality of radial grooves formed in said circumference of said ring, said grooves for providing a plurality of lubrication channels through said ring, each groove being separated from each adjacent groove by an angle within a range of from 45° to 90°, and wherein said torodial shaped ring is mounted around a reduced diameter portion of a transmission shaft, said ring being comprised of copper and having a flush side and a tapered side with said flush side being seated in juxtaposition to a thrust washer and said tapered side being seated in an interior recess for locking said transmission shaft to a differential housing, said orthogonal separation of said ring providing a high resistance to misaligning and shattering of said ring.

34. A method for providing a lock ring for a vehicle differential assembly, said method comprising the steps of:
providing a torodial shaped ring, said ring having a separation formed through said ring, said separation being orthogonal to a circumference of said ring for providing a spring-like lock;
forming a plurality of radial grooves in said circumference of said ring, said grooves for providing a plurality of lubricating channels through said ring;
separating each groove from each adjacent groove by an angle within a range of from 45° to 90° for providing sufficient lubrication;
mounting said torodial shaped ring around a reduced diameter portion of a transmission shaft; and
forming said torodial shaped ring from copper and providing a flush side and a tapered side with said flush side being seated in juxtaposition to a thrust washer and said tapered side being seated in an interior recess for locking said transmission shaft to differential housing, said orthogonal separation of said ring providing a high resistance to misalignment and shattering of said ring.

* * * * *

UNITED STATES PATENT AND TRADEMARK OFFICE
CERTIFICATE OF CORRECTION

PATENT NO. : 4,815,337
DATED : March 28, 1989
INVENTOR(S) : GARY T. PELOQUIN

It is certified that error appears in the above-identified patent and that said Letters Patent is hereby corrected as shown below:

Column 16, line 25, Claim 1, insert --of a-- after "first".

Column 19, line 3, Claim 22, insert --of a-- after "first".

Column 19, line 61, Claim 28, insert --differential" after "second".

Signed and Sealed this

Fourteenth Day of November, 1989

Attest:

JEFFREY M. SAMUELS

*Attesting Officer*   *Acting Commissioner of Patents and Trademarks*